(12) United States Patent
Ho (10) Patent No.: US 9,643,378 B2
(45) Date of Patent: May 9, 2017

(54) COMPOSITE PANEL FOR GREEN BUILDING SYSTEM

(71) Applicant: Perfect Sourcing Company Limited, Hong Kong (HK)

(72) Inventor: Hok Cheung Ho, Hong Kong (HK)

(73) Assignee: Perfect Sourcing Company Limited, Hong Kong (HK)

( * ) Notice: Subject to any disclaimer, the term of this patent is extended or adjusted under 35 U.S.C. 154(b) by 0 days.

(21) Appl. No.: 14/804,358

(22) Filed: Jul. 21, 2015

(65) Prior Publication Data

US 2016/0052224 A1 Feb. 25, 2016

(30) Foreign Application Priority Data

Aug. 19, 2014 (SG) .............................. 10201405027S (51) Int. Cl.
*B32B 3/12* (2006.01)
*E04C 2/04* (2006.01)
(Continued)

(52) U.S. Cl.
CPC .................. *B32B 3/12* (2013.01); *B32B 7/12* (2013.01); *B32B 13/02* (2013.01); *B32B 13/06* (2013.01); *B32B 13/12* (2013.01); *B32B 15/20* (2013.01); *B32B 27/20* (2013.01); *E04C 2/04* (2013.01); *E04C 2/08* (2013.01); *E04C 2/20* (2013.01); *E04C 2/46* (2013.01); *B32B 2262/101* (2013.01); *B32B 2305/024* (2013.01); *B32B 2307/306* (2013.01); *B32B 2307/3065* (2013.01); *B32B 2307/412* (2013.01); *B32B 2307/416* (2013.01); *B32B 2307/54* (2013.01); *B32B 2307/712* (2013.01); *B32B 2307/714* (2013.01); *B32B 2307/7145* (2013.01); *B32B 2307/7265* (2013.01);
(Continued)

(58) Field of Classification Search
CPC .. B32B 3/12; B32B 7/12; B32B 13/02; B32B 13/06; B32B 2262/101; B32B 2305/024; B32B 37/146; B32B 2419/00; B32B 15/20; B32B 2250/40; B32B 2307/3065; B32B 13/04; E04C 2/04; E04C 2/08
See application file for complete search history.

(56) References Cited

U.S. PATENT DOCUMENTS 2,892,339 A * 6/1959 Flower ..................... B28B 1/44
                                                                            249/36
2,952,579 A * 9/1960 Merriman ............. B21D 47/00
                                                                            156/197
(Continued)

FOREIGN PATENT DOCUMENTS

CN    2713036 Y    7/2005
CN    2853961 Y    1/2007
(Continued)

OTHER PUBLICATIONS

Search Report of counterpart Singaporean Patent Application No. 10201405027S issued on Apr. 17, 2015.

*Primary Examiner* — Beth Stephan (57) ABSTRACT

Composite panel for building construction comprises a first layer of honeycomb structure, and a load-bearing layer attached to the first layer of honeycomb structure contiguously or at distance for carrying external load of the composite panel in a lateral direction of the honeycomb structure.

14 Claims, 3 Drawing Sheets

(51) Int. Cl.
    *E04C 2/08*     (2006.01)
    *E04C 2/20*     (2006.01)
    *E04B 2/00*     (2006.01)
    *B32B 7/12*     (2006.01)
    *B32B 13/02*    (2006.01)
    *B32B 13/06*    (2006.01)
    *B32B 13/12*    (2006.01)
    *B32B 15/20*    (2006.01)
    *B32B 27/20*    (2006.01)
(52) U.S. Cl.
    CPC ..... *B32B 2307/752* (2013.01); *B32B 2419/00* (2013.01); *B32B 2607/00* (2013.01)

(56) References Cited

U.S. PATENT DOCUMENTS

| | | | | |
|---|---|---|---|---|
| 4,001,473 | A * | 1/1977 | Cook | B32B 3/12 181/292 |
| 4,235,303 | A * | 11/1980 | Dhoore | B64D 33/02 181/214 |
| 4,249,976 | A * | 2/1981 | Hudson | B32B 3/12 156/286 |
| 4,251,579 | A * | 2/1981 | Lee | A62C 35/00 169/26 |
| 4,336,292 | A * | 6/1982 | Blair | B32B 3/12 228/175 |
| 4,353,947 | A * | 10/1982 | Northcutt | B29C 70/08 156/290 |
| 4,539,244 | A * | 9/1985 | Beggs | B32B 3/12 181/292 |
| 4,937,125 | A * | 6/1990 | Sanmartin | B32B 3/12 428/116 |
| 4,973,506 | A * | 11/1990 | Bauer | B32B 3/12 428/116 |
| 5,106,668 | A * | 4/1992 | Turner | B32B 3/12 428/116 |
| 5,212,003 | A * | 5/1993 | Homer | F16B 5/01 428/116 |
| 5,305,577 | A * | 4/1994 | Richards | B28B 1/525 428/218 |
| 5,445,861 | A * | 8/1995 | Newton | B32B 3/12 181/290 |
| 5,460,865 | A * | 10/1995 | Tsotsis | B32B 3/12 428/116 |
| 5,518,796 | A * | 5/1996 | Tsotsis | B32B 3/12 428/116 |
| 6,253,530 | B1 | 7/2001 | Price et al. | |
| 6,387,469 | B1 * | 5/2002 | Ristow | B32B 3/12 29/428 |
| 6,440,257 | B1 * | 8/2002 | Zhou | B29D 24/005 156/307.3 |
| 7,127,865 | B2 * | 10/2006 | Douglas | E02D 27/02 52/270 |
| 7,507,461 | B2 * | 3/2009 | Wang | B32B 3/12 156/307.3 |
| 7,581,366 | B2 * | 9/2009 | Smith | B32B 3/12 156/242 |
| 7,988,809 | B2 * | 8/2011 | Smith | B32B 3/12 156/292 |
| 8,025,954 | B2 * | 9/2011 | Horigome | B32B 3/12 428/116 |
| 8,453,793 | B1 * | 6/2013 | Franzoi | F02C 7/045 181/284 |
| 2001/0015039 | A1 * | 8/2001 | Zambelli | E04B 5/04 52/220.3 |
| 2002/0014051 | A1 * | 2/2002 | Fraval | B28B 1/503 52/794.1 |
| 2006/0048640 | A1 * | 3/2006 | Terry | F41H 5/0414 89/36.02 |
| 2008/0307729 | A1 * | 12/2008 | Maimon | E04C 2/292 52/332 |
| 2009/0095206 | A1 * | 4/2009 | Dacus | B29C 70/088 108/57.27 |
| 2009/0155526 | A1 * | 6/2009 | Levit | B32B 3/12 428/116 |
| 2012/0021168 | A1 * | 1/2012 | Tanii | B32B 3/12 428/116 |
| 2014/0013695 | A1 * | 1/2014 | Wolynski | E04B 1/167 52/426 |
| 2015/0308472 | A1 * | 10/2015 | Brace | F16B 35/041 411/404 |

FOREIGN PATENT DOCUMENTS

| | | |
|---|---|---|
| CN | 2873489 Y | 2/2007 |
| CN | 104032920 A | 9/2014 |

* cited by examiner

COMPOSITE PANEL FOR GREEN BUILDING SYSTEM

CROSS REFERENCE TO RELATED APPLICATIONS

This application claims priority of Singapore application No. 10201405027S, filed on Aug. 19, 2014, the entire contents of which are all hereby incorporated by reference.

BACKGROUND

Technical Field

The present application relates to one or more composite panels for green building system. The application also relates methods of making, separating, joining, scraping, modifying, maintaining, recycling and using the one or more composite panels for green building system.

Related Art

Composite panels (also known as composition materials, composite materials or composites) are construction materials made from two or more constituent materials with different physical or chemical properties respectively. The individual constituent materials typically remain separate and distinct from each other within a finished structure of the composite materials. The composite panels become attractive to building industry because they can be stronger, lighter and/or less expensive than traditional monolithic or uniform materials. For example, composite sandwich structure panel or sandwich-structured composite has light-weight, possesses high bending stiffness and has overall low mass density. However, in order to construct environmentally friendly buildings (also known as green building systems) with lower cost, faster speed, more thermal comfort and better structural integrity, modern building industry has been constantly looking for construction materials having even higher strength, better thermal insulation capability and further weight reduction. It is thus an objective of the present application to provide composite panels or methods for constructing green building systems in order to meet the demand of building industry.

SUMMARY

The present application aims to provide one or more new and useful devices and/or methods. According to a first aspect of the application, the application provides a composite panel for building construction. A building is known to be man-made structure with a roof and walls standing more or less permanently in one place for human occupancy.

The composite panel comprises a first layer of honeycomb structure and a load-bearing layer attached to the first layer of honeycomb structure contiguously or at distance with gap or filler(s) in-between. For example, the load-bearing layer is attached to the first layer of honeycomb structure in a longitudinal direction of the honeycomb structure or cells of the honeycomb structure. The load bearing layer is constructed or provided for carrying external load of the composite panel in a lateral direction of the honeycomb structure. The composite panels may be termed as composite panel, composite board, Sandwich-structured composite or sandwich panel.

The honeycomb structure is typically formed by clusters of hexagonal cylinders whose walls are joined laterally. Broadly speaking, the honeycomb structure also includes cylinders of other polygon, whist edge profiles of the cells may be circular, oval or a combined shape of any of these plane geometries. Ends, edge or ridges of these cylinders are typically levelled and tessellated in forming for providing a continuous surface, sheet or layer. Alternatively speaking, the honeycomb structure is formed by cells that have their walls joined to each other. Axes of the cells or cylinders determine a longitudinal direction of the honeycomb structure. In contrast, a lateral direction or lateral axis/axes are usually perpendicular to the longitudinal direction, but parallel to end surfaces of the cells or cylinders. Hence, often, the lateral direction is perpendicular to walls of the cells or cylinders for providing an optimum strength of the honeycomb structure. Typically, the honeycomb structure is designed to carry or support load (i.e. external burden) in the longitudinal axes of the cells or cylinders, but not in the direction of lateral axis. In other words, the honeycomb structure may be easily crushed or destroyed by applying load to its lateral axis.

The load-bearing layer is provided by a rigid material that has compressive strength, tensile strength, bending strength, yield strength, fatigue strength, impact strength, shearing strength or combinations of any of these strengths. One of the load-bearing layers may be joined to ends of the cells partially or completely such that the first layer of honeycomb structure and the load-bearing layer(s) become a single building component or monolithic structure. Lateral parts, side edges or corners of the load-bearing layer may be aligned or extend beyond peripheral borders (sides, edges) of the first layer of honeycomb structure so that the load-bearing layer can provide structural support to lateral sides of the first layer of honeycomb structure. Additional materials may be filled between the load-bearing layer and the first layer of honeycomb structure, such as foam, paste, cement, adhesive/glue, board(s), powder, vacuum or air. Structural connection between the load-bearing layer and the first layer of honeycomb structure may be provided by fasteners, glue, partially melted or solidified parts of load-bearing layer and the first layer of honeycomb structure, or connecting bars.

Here, the load-bearing layer not only provides a skin (honeycomb edge surface covering) material to the honeycomb structure, but also carries external and internal load in a lateral direction of the honeycomb structure. In contrast, the first layer of honeycomb structure possesses low weight, high stiffness, more durability and cost savings as compared to conventional building materials. The composite panel has integrated the first layer of honeycomb structure and the load-bearing layer together for providing load-bearing wall panels, which can provide excellent structural strength at less weight. The integration offers the composite panel with greater strength to against external loading, such as bending, cracking or vibration.

The load-bearing layer can comprise a frame that surrounds one or more peripheral edges of the first layer of honeycomb structure for load bearing. For example, the load-bearing layer provides two pillars at opposite edges of the first layer of honeycomb structure, at the same level and having the identical thickness as compared to the honeycomb structure. The frame may comprise rims that are connected to each other at their ends for wrapping around the peripheral or lateral borders of the first layer of honeycomb structure with a closed loop. The frame may further comprise a cover sheet that extends to one or more sides of the frame, similar to shape of a box frame for enclosing the first layer of honeycomb structure. The frame itself may incorporate wires, rods, studs, fins, ribs or other structural supporting elements for carrying the external load. Since the frame may not have protruding parts, the composite panel has similar visual appearance or forms as prefabricated wall panels, being easily adopted for making an entire or part of a load-bearing wall.

The load-bearing layer may further comprise a slab that extends over or till ridges of the cells of the first layer of honeycomb structure for covering longitudinal ends of the cells. The slab may not completely cover the peripheral edge(s) of the first honeycomb structure, although the slab may cover the broad expanse of the first layer of honeycomb structure. The broad expanse of the first layer of honeycomb structure is parallel to ends of the honeycomb cells, but substantially perpendicular to longitudinal axes of these cells. In one embodiment, lateral edges of the slab are flush or even with the edges of first layer of honeycomb structure. The slab may have substantially thickness such that the slab can support heavy external loading. The slab provides a thick layer of resistance that can further against flame, corrosion, crack, insects (e.g. ants), rodents, impact, vibration or other mechanical disturbance. The slab itself may be formed by one or more composite panels by lateral joining or longitudinal stacking.

In practice, the slab can comprise concrete, plastics, glass, metal or combinations of any of these. For example, the slab is made from water, coarse granular material (i.e. fine and coarse aggregate or filler) embedded in a hard matrix of cement or binder in making a concrete slab. The concrete slab has high compression strength, resistant to fire and water. When joined to the first layer of honeycomb structure, the composite board can resist bending or tension better. Features or mechanical properties of the other materials (e.g. glass or quartz) may be similarly complimented by the first layer of honeycomb structure such that the composite panel becomes much more robust for either loading bearing, room partition or both. For example, the slab that is formed by load-bearing aluminium alloy attached to the first layer of honeycomb structure in its lateral direction, the resulted composite panel or material can resist external crushing force from six directions of the composite panel according to Cartesian coordinate system.

The load-bearing layer, the first layer of honeycomb structure, or both components of the composite panel may be resistant to water, flame, acid or alkaline corrosion, oxidization, mechanical impact, thermal shocks, electromagnetic radiation (e.g. sunlight) or combinations of any of these. Buildings, such as modern skyscrapers or houses, have to meet relevant regulations (e.g. Standard Assessment Procedure of UK) in order to be accepted for selling and living. Robust, durable or high-quality buildings have to withstand attacks of water (rain or flood), fire, fume, acidic rain due to air pollution, natural cooling and heat cycle (day heating & night cooling), and earthquakes over many years. Thus, resistance of the load-bearing layer, the first layer of honeycomb structure or both become important for providing excellent living conditions to users or residents of the building, especially because load-bearing walls of the building typically are not repaired or exchanged during entire life time of the building, possibly fifty to one hundred years. For example, in case of fire occurrence within one apartment of the building, loading bearing walls of the building need to provide reliable structural support to all parts of the building for ensuring both short term (e.g. during fire) and long term (e.g. after flood) safety.

The load-bearing layer can be structurally or internally reinforced by ribs, fibres, fins or bars to against structural failure or corrosion. For example, corrosion inhibitors, such as calcium nitrite ($Ca(NO_2)_2$), can be added to water mix before pouring concrete of the load-bearing layer. Even multiple layers of boards or load-bearing layers may be fastened together for reinforcing each other. Moreover, the load-bearing layer may be singly reinforced, doubly reinforced, under-reinforced, over-reinforced or balance-reinforced, similar to those of beam of a building. In an embodiment, the load-bearing layer may be provided by fibre-reinforced concrete for resisting crack failure of the load-bearing layer. Materials that are suitable for providing the fibres include Fibre-Reinforced Polymer (FRP) and Glass-reinforced plastic (GRP), steel, glass or other plastic fibres.

The composite panel may further comprise a second layer of honeycomb structure that is attached to the load-bearing layer on an opposite side of the first layer of honeycomb structure. The second layer of honeycomb structure may have similar or different material or filler(s), as compared to the first layer of honeycomb structure. Accordingly, multiple layers of honeycomb structure are stacked up in longitudinal axes of the cells, which are separated by one or more face sheets, such as the concrete slab. Since the first and second layer of honeycomb structure provides supports from two broad spans of the loading bearing layer from opposed sides, the load bearing layer may adopt a thinner structure for preventing bending, incurring less cost and weight for construction. The load bearing layer may further have more even temperature at its opposite sides because these two sides are both roofed the honeycomb structures.

Since different materials may be provided for making the first layer of honeycomb structure and the second layer of honeycomb structure, the composite panel can provide various features for meeting desired user requirements. For example, if the first and the second layers of honeycomb structures are made of glass-reinforced plastic and Nomex aramide paper reinforced plastic materials, the composite panel can resist corrosion at the side of the first layer, as well as low flammability at the side of the second layer.

Cells of the first layer of honeycomb structure and the second layer of honeycomb structure can be void, fully or partially packed with same or different fillers (packing or filing materials). Depending on construction requirement (e.g. Fire resistance by incorporating flame retardant), interior materials of the cells offers extra mechanism to meet the construction requirement, in addition to strengthening structural integrity of the first layer of honeycomb structure. For example, the first layer if honeycomb is filed with metallic filler, and is capable of resisting projectile impact.

One or more components of the composite panel may be fully or partially transparent. Examples of the transparent materials for making the components include Perspex (acrylic glass, methyl methacrylate), cast glass, crown glass, cylinder glass, drawn sheet glass, cast plate glass, polished plate glass, rolled plate (figured) glass, float glass, prism glass, annealed glass, laminated glass, toughened glass, heat-strengthened glass, chemically strengthened glass, heatable (capable of being heated or cooled) glass, self-cleaning glass, insulated glazing, evacuated glazing and other types of transparent materials. Accordingly, the composite panel may be partially or fully transparent for being able to see-through (clear glass) or visionblurring (e.g. frosted glass). Lighting, lenses or other optical equipment may internally incorporated or externally mounted for providing vision observation or illumination to ambient of the composite panel or wall(s). For example, LED (Light Emitting Diode) light bulbs can be installed into cells of the honeycomb structure such that the composite panel becomes an illuminating or light-projecting wall.

One or more components of the composite panel can be fully or partially light reflective. Reflective components of the composite panel enable the composite panel to brighten interior and exterior of the building. The composite panel may further act as wall reflectors such that electricity consumption for lighting of the building may be reduced.

Ridges at longitudinal ends of the first layer of honeycomb structure may be embedded into its face sheet (e.g. the load-bearing layer). For example, if the face sheet is made of cement or concrete, the ridges may be partially immersed or inserted into the face sheet such that the first layer of honeycomb structure and the face sheet are integrated together as one monolithic panel. In other words, surface material of the face sheet becomes adhesive or glue that binds the first layer of honeycomb structure and the face sheet together.

The application further provides a building for human residence, which comprises or includes a foundation for providing structural support to the building, and the composite panel as described above and hereinafter. In contrast to adopting conventional brick walls or stones, the building provides the same structural integrity, durability and comfort at lower cost and material consumption. Traditionally, load-bearings walls (bearing walls) have to be constructed by solid concrete blocks, bricks or stones because the load-bearing walls have to possess appropriate thicknesses to carry the weight above them. In contrast, the composite panel not only can support weight above it, but also incorporate or provide additional feature to the load-bearing wall, such as thermal insulation, noise attenuation or vibration absorption. Structures and component dimensions of the composite panel may be adapted to load or weight that is designed to carry (e.g. ceiling, beam and window).

The composite panel can be fully or partially integrated into the foundation. One form of integration includes inserting a lower portion of the composite panel into a concrete foundation in the midst of curing process. The composite panel may further serve as structural part of the foundation such that the entire building becomes more structurally robust.

The application presents one or more composite panels or buildings for residence substantially as hereinbefore or hereinafter described with reference to or as illustrated in any of the accompanying drawings. The application presents one or more methods for manufacturing composite panels or buildings for residence substantially as hereinbefore or hereinafter described with reference to or as illustrated in any of the accompanying drawings.

According a second aspect, the present application further provides a method for constructing or making a composite panel or building, which comprises a first step of providing a load-bearing layer, a second step of attaching a first layer of honeycomb structure to the load-bearing layer such that the load-bearing layer is configured to provide structural support in a lateral direction of the first layer of honeycomb structure. The lateral direction of the honeycomb structure is usually transverse or perpendicular to cell walls of the honeycomb structure. Alternatively, the composite panel may be improvised as a non-load-bearing wall when necessary. The method provides a straightforward solution to building construction and offers benefits of robustness and durability of the building at much lower cost.

The method can further comprise a step of fixing a second layer of honeycomb structure to the load-bearing layer on an opposite side of the first layer of honeycomb structure such that the load-bearing layer is configured to provide structural support in lateral directions of both the first and second layer of honeycomb structures or webs. In other words, the load-bearing layer, panel or board is strengthened at its opposite sides such that the load-bearing layer can resist bending, vibration and cracking better.

The application provides a composite sandwich panel for building construction. The composite sandwich panel comprises a first layer of honeycomb structure, and a first face sheet attached to the first layer of honeycomb structure contiguously or at distance for covering ridges of the honeycomb structure at longitudinal ends of cells of the honeycomb structure. The first face sheet, the honeycomb structure or both are partially or fully transparent.

The honeycomb structure or composite sandwich panel further comprises a second face sheet attached to the honeycomb structure at opposite sides of the cells of the honeycomb structure. The second face sheet may be partially or fully transparent.

The first face sheet may be reflective or light-absorbing to whole spectrum of light or to specific spectrum of light.

The first or second layer of honeycomb structure can be reflective, transparent, semi-transparent or light-absorbing.

The first or second face sheet is load bearing for providing structural support in a lateral direction of the first, second or both layers of honeycomb structure.

One or more embodiments of the application utilizes polyurethane and concrete based honeycomb structure for providing composite panels. Polyurethane is good heat insulation material, whilst the concrete material provides good structural support. The unique structure and composition of the present composite panel can replace bricks and tiles that are energy demanding and polluting, and provide good structural integrity to green building systems. Since the composite panels can be prefabricated, they require less electricity and areas of process at construction sites, thus reducing construction cost. Since the polyurethane material absorbs vibration well, green building systems that adopt the composite panel can endure earthquake. Partially damaged composite panel does not affect performance of remaining portion of the composite panel.

Although polyurethane cannot resist fire well, the loading-bearing layer that is made of fire-resistant material (e.g. concrete) can prevent the polyurethane from being burnt. Fume from scotched polyurethane is kept inside the composite panel, being prevented from harming residents of the green building systems. Honeycomb structure that is filled by polyurethane has good thermal insulation and sound attenuation capabilities such that they enable green building (systems) to consume less energy for heating with more comfort. When exposed to fire or extreme high temperature, although polyurethane may be carbonized, the entire composite panel can still be used because the concrete material can withstand fire. After minor maintenance, green building systems that adopt the concrete panel can continue to be used for prolonged time period.

When making the composite panel, a concrete baseplate may be used instead of traditional wooden moulds. After curing, no mould is required to be removed because multiple layers of materials are cured into one monolithic structure, preventing internal stress of the composite panel.

The composite panel may be mass produced by production lines continuously, which reduce cost of manufacturing, maintaining consistent quality and preventing shrinkage or deformation.

Following benefits are just some examples of the composite panels according to the disclosed embodiments.

1. Composite panels adopt honeycomb structure and have multiple layers such that the composite panels can have pre-stressed structure, preventing fracture before usage.

2. Filler of low density or foam for honeycomb structures makes the composite panels to be integral, which help to reduce weight and material consumption of building walls, provide benefits of thermal insulation, noise attenuation and vibration absorption.

3. The composite panel is able to resist liquid penetration or osmosis by rainwater.

4. Since the honeycomb structure and its filler is covered by face plates or the load-bearing layer, the filler is prevented from decomposition or pulverization. Green building systems that adopt the composite panels require less maintenance, thus saving cost.

5. The composite panels provide more design freedom to designers for having 3-D impression because the composite panels are thicker than usual concrete plates.

6. Since the composite panels provide good thermal insulation, water or moisture condensation is prevented from occurring inside the green building when external temperature fluctuates. Mildew or insect infestation is prevented.

7. The composite panels implement metal rebars (reinforcing bars) or fibre based rebars, whether artificial, synthetic or natural fibres. The synthetic or natural fibre based rebars are generally heat resistant (insulate), do not peel off easily. Accordingly, the composite panels of synthetic fibre or natural fibre rebars can prolong life of green buildings, suitable for extreme weather conditions.

8. The composite panel is suitable for constructing balcony because they resist water, noise and heat.

The accompanying figures (FIGS.) illustrate embodiments and serve to explain principles of the disclosed embodiments. It is to be understood, however, that these figures are presented for purposes of illustration only.

DETAILED DESCRIPTION

Exemplary, non-limiting embodiments of the present application will now be described with references to the above-mentioned figures.

Figure 1:
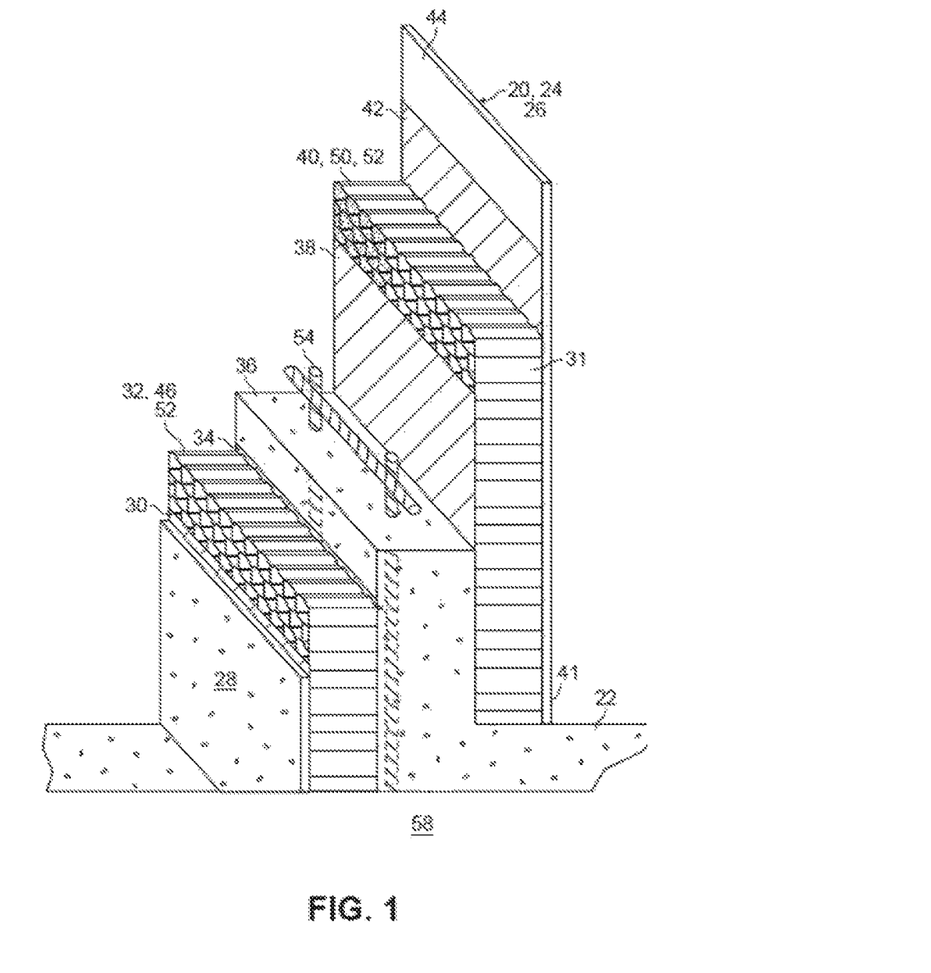
FIG. 1 illustrates a first composite panel.
Figure 2:
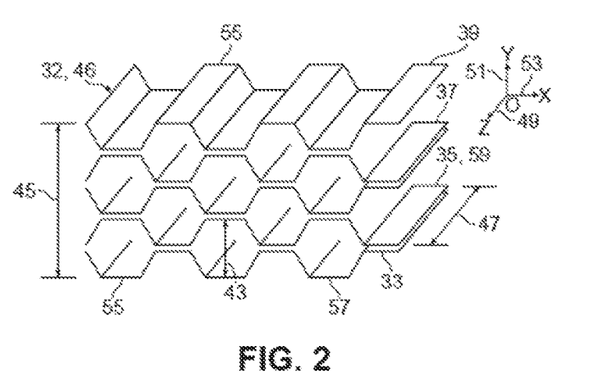
FIG. 2 illustrates an aluminium honeycomb web of the first composite panel.

FIGS. 1-2 relate to a first embodiment of the present application. The first embodiment has parts or method steps that are similar or identical to other embodiments of the application. Description of the similar or identical parts is hereby included by reference wherever appropriate.

In particular, FIG. 1 illustrates a first composite panel 20 that is cut off and exposed for showing its internal structure. The first composite panel 20 is vertically inserted into a concrete foundation 22 that is horizontally laid. In other words, the first composite panel 20 provides a portion of a load-bearing wall 24 (bearing wall) of a building 26, which is situated and supported by the concrete foundation 22. The concrete foundation 22 is also known as shallow foundation for a house or a deep foundation for a skyscraper.

The first composite panel 20 comprises many layers of materials or strata of various thicknesses, which are sequentially attached to each other. According to FIG. 1, the first composite panel 20 comprises a concrete baseplate 28, a plate adhesive film 30, an aluminium honeycomb web (i.e. aluminium web) 32, a slab adhesive film 34, a concrete slab 36, a slab adhesive layer 38, a fibreglass honeycomb web (i.e. fibreglass web) 40, a plate adhesive layer 42 and a concrete faceplate 44, which are successively and contiguously joined to each other. These webs 32, 40 are alternatively known as honeycomb cores, whilst the concrete baseplate 28, the concrete slab 36 and the concrete faceplate 44 may be termed as face sheets.

The concrete baseplate 28 is glass fibre reinforced (known as GFRC) that increase tensile strength of the concrete baseplate 28 by several folds. The glass fibre reinforced concrete baseplate 28 incorporates high strength glass fibres embedded in a cementitious matrix. In this form, both fibres and matrix retain their physical and chemical identities, while offering a synergism, whereby a combination of properties that cannot be achieved with either of the components acting alone. The glass fibres are principal load-carrying members, while surrounding matrix keeps them in the desired locations and orientation, acting as a load transfer medium between the fibres and protecting them from environmental damage. In fact, the glass fibres provide reinforcement to the matrix and other useful functions in the fibre reinforced composite panels. These glass fibres are incorporated into the matrix in both continuous and discontinuous (chopped) lengths. When the concrete baseplate 28 faces external harsh environmental conditions, the glass fibres (e.g. spun basalt fibre) of the concrete baseplate 28 prevent cracking in curing or drying process. In fact, the concrete baseplate 28 is water, fire and corrosion resistant.

Particularly, the plate adhesive film 30 (e.g. Collano 22.111 with chemical basis of HDPE) bonds the concrete baseplate 28 and the aluminium web 32 after heat treatment at about 125° C. (degree Celsius). Similarly, the slab adhesive film 34 is made of polymer material that has high modulus and high strength, as available in dry films form. The plate adhesive film 30 and the slab adhesive film 34 keep the concrete baseplate 28, the aluminium web 32 and the concrete slab 36 together permanently.

The aluminium web 32 comprises cells 46 of columnar and hexagonal shapes. These cells 46 of the aluminium material are filled with air, or may be seen as empty. In contrast, although cells 31 of the fibreglass web 40 also have hexagonal cylindrical profiles, the fibreglass cells 31 are packed with polyurethane material 50. Hence, both the aluminium web 32 and the fibreglass web 40 are occupied with filler 52 or infilling materials. Since both air and polyurethane material 50 are poor heat conductors, the aluminium web 32 and the fibreglass web 40 prevent heat transfer from the concrete baseplate 28 and the concrete faceplate 44 to the concrete slab 36. In other words, large temperature difference (e.g. 50° C.~-16° C.) can be kept between the concrete baseplate 28 and the concrete faceplate 44. The aluminium web 32 further provides radio frequency (RF) shielding because cellular structure of the cells 46 offers a myriad of wave guides for attenuating a required Db level through a wide frequency range.

The concrete slab 36 is steel reinforced concrete and prefabricated (i.e. in situ), known as pre-cast concrete (r.c. slab or r.c.). In other words, the concrete slab 36 has reinforced steel or reinforced bars (known as rebars) 54 positioned at core position of the concrete slab 36. The reinforced bars 54 extend throughout a length and width of the concrete slab 36 such that they provide additional tensile strength. Since the thermal expansion coefficient of concrete is similar to that of steel, the concrete slab 36 does not experience large internal stresses due to differences in thermal expansion or contraction. When cement paste within the concrete slab 36 hardens, the cement paste conforms to the surface details of the reinforced bars 54, permitting any stress to be transmitted efficiently between two different materials (cement and steel). The reinforced bars 54 are roughened and corrugated, which further improve the bond or cohesion between the cement and reinforced bars 54. Alkaline chemical environment provided by the alkali reserve (KOH, NaOH) and the portlandite (calcium hydroxide) contained in dried/hardened cement paste causes a passivating film to form on surfaces of the reinforced bars 54, making them much more resistant to corrosion. In addition to the cement paste and reinforced bars 54, the concrete slab 36 is composed of water, coarse granular material (the fine and coarse aggregate or filler) embedded in a hard matrix of material (the cement or binder), which fills void among the aggregate particles and glues them together. The concrete slab 36 has large thermal mass, thus preventing large temperature fluctuation between its opposite surfaces.

The slab adhesive layer 38 is epoxy material that permanently binds the concrete slab 36 and the fibreglass web 40 together. Likewise, the plate adhesive layer 42 attaches the concrete faceplate 44 to the fibreglass web 40.

The fibreglass web 40 has structure and dimensions similar to those of the aluminium web 32. For example, hexagonal cell sizes (measured across flat areas as thickness "t") of both the fibreglass web 40 and the aluminium web 32 are about 24 mm (millimetres). However, in contrast to the aluminium web 32, cells 31 of the fibreglass web 40 are packed with polyurethane foam, which are known as filler 52. The filler 52 provides structure support to the fibreglass web 40, prevents heat conduction and blocks sound transmission across the cells 31 of the fibreglass web 40. The fibreglass web 40 is also capable of absorbing sound waves and reduces noise transmission.

The concrete faceplate 44 is reinforced with microfibers that provide flexibility and strength to the concrete faceplate 44. The microfibers are micro-synthetic polyurethane fibres (i.e. known as multifilament) which inhibit early age shrinkage cracking, reduce settlement cracking, increases impact resistance, improves shatter resistance, lessens water migration, upgrades abrasion resistance, decreases rate of corrosion and minimises residual strength. A room-facing surface 56 of the concrete faceplate 44 has been mechanically and chemically treated to provide a very abrasion resistant and durable concrete surface. The room-facing surface 56 is on an opposite side of the plate adhesive layer 42. Particularly, the room-facing surface 56 of the concrete faceplate 44 has been grinded, applied with sealer and hardener (chemically reactive concrete stabilizer, such as Retro Plate 99™), and completed with polishing. Hence, the room-facing surface 56 provides excellent abrasion resistance, hardness and impact resistance. Typically, the room-facing surface 56 is prepared by grinding, covering with sealer and hardener, and finalised by polishing. Accordingly, the room-facing surface 56 provides aesthetically appealing finishing and technically durable surface quality, suitable for indoor livings.

FIG. 2 illustrates the aluminium honeycomb web 32 of the first composite panel. The aluminium honeycomb web 32 is formed by multiple corrugated aluminium sheets 33, 35, 37, 39 that are joined together. The cells 46 of the aluminium web 32 are formed between these sheets 33, 35, 37, 39. A Cartesian coordinate 49, 51, 53 has been depicted beside the aluminium web 32 for indicating orientation. These cells 46 are hexagonal in shape of uniform size, although alternative shapes (e.g. square, rectangle) of various sizes 43 may be implemented in practice. For standardization, the sizes 43 are determined by a distance between opposite edges or ridges 55. Similarly, a width (w) 45 of the aluminium web 32 is determined by a distance between lateral edges of the cells 46 across the entire aluminium web 32. A length of the aluminium web 32 similarly measured by a distance between opposite borders/edges of the entire aluminium web 32. In contrast, thickness 47 of the aluminium web 32 is decided by a distance between a front ridge 57 to a rear ridge 59 of the same cell 46. Using the Cartesian coordinate 49-53, Z-axis 49 indicates a longitudinal direction 49 of the aluminium web 32 or cell 46, whilst the Y-axis 51 provides a lateral direction 51 of the aluminium web 32 or cell 46. Similar to other honeycomb structures, the aluminium web 32 is strong in providing support in the longitudinal direction (i.e. Z-axis) 49, but weak in the lateral direction 51, 53 (Y-axis & X-axis). Referring also to FIG. 1, the honeycomb structure cannot support force in both length and width directions.

These many sequentially attached layers of the first composite panel 20 form a single monolithic structure. Particularly, a lower portion 41 of the first composite panel 20 is embedded and vertically inserted into the concrete foundation 22 such that the first composite panel 20 becomes a load-bearing wall. The fibre-reinforced concrete slab 36 transfers weight of the first composite panel 20, external impact and its supported structure (e.g. roof and beams) to the concrete foundation 22.

The concrete baseplate 28 blocks intrusion of foreign objects from damaging the first composite panel 20. Rainwater, sunlight, heat and wind are prevented by the concrete baseplate 28 from comfortable environment at the side of the room-facing surface 56. The aluminium honeycomb web 32 provides structural strength, thermal insulation, sound attenuation and shock absorption capabilities to the first composite panel 20. In addition, the fibreglass web 40 further provides lightweight, low dielectric properties and good thermal insulation with excellent mechanical properties (e.g. tensile strength, impact strength, etc.), as compared to honeycomb structure of other materials (e.g. aramid fibre). The filler (polyurethane foam) 50 of the fibreglass web 40 offers wide range of hardness, high load bearing capacity, good abrasion and impact resistance, resistance to water, oil and grease, strong bonding property, as well as mould, mildew and fungus resistance.

Having external support at opposite sides, the concrete slab 36 offer strong mechanical support to building structure with its relatively thin body, as compared to a wholly concrete-made wall. The two honeycomb webs 32, 40 clamp the concrete slab 36 in-between and prevent the first composite panel 20 from bending in its thickness direction (i.e. lateral direction according to FIG. 1). The two honeycomb webs 32, 40 further absorb external impact to the concrete slab 36, thus making the load bearing all 20 much durable and robust. The concrete slab 36 is an excellent flame retardant, which makes the building to be fire safe, especially for high-rise building.

In the first composite panel 20, the concrete baseplate 28 may be substituted by or added with one or more cladding materials, such as metal sheets (e.g. aluminium or stainless steel), wood sheets (e.g. plywood), plastic lading (e.g. vinyl weatherboard sheets), epoxy carbon tape, epoxy UD (Ultra-low Dispersion) glass, and coatings (e.g. wall paints). In contrast, the concrete faceplate 44 can be additionally replaced with veneered plywood, asbestos-cement board, veneered particle board or solid wood.

The cells 31, 46 of the aluminium web 32 and the fibreglass web 40 may be partially or fully constructed by aramid (normex or nomex) fibre, Korex, Kevlar, carbon, paper, polyurethane materials or other thermoplastic materials (e.g. ABS, polycarbonate and polyethylene). Cells 31, 46 of the webs 32, 40 may be partially or fully filled with syntactic foam and integral skin foam, such as PVC (Polyvinyl Chloride) foam.

The concrete slab 36 may be exchanged by fire bricks, clay blocks, stone (rock), wood (timber), cement composite, glass, gyperete, metal, plastics, ceramics or combination of any of these materials.

In use, the first composite panel 20 is prefabricated according to predetermined dimensions and surface finishing quality requirements. The lower portion of the first composite panel 20 is then vertically inserted into the freshly laid the concrete foundation 22, before its curing. The concrete foundation 22 is later cured such that the first composite panel 20 and the concrete foundation 22 are fused in becoming one immovable body for load bearing. Other structural components of the building 26 are subsequently mounted directly or indirectly onto the concrete foundation 22 and the load-bearing wall, such as wood or steel roof trusses, floor trusses, floor panels, I-joists, or engineered beams and headers.

When making the first composite panel 20, the reinforce bars 54 are joined to each other in making a framework that covers a rectangular area. The framework is laid into a mould that receives concrete. The concrete is composite panel composed of water, coarse granular material (the fine and coarse aggregate or filler) embedded in a hard matrix of material (the cement or binder), which fills the space among the aggregate particles and glues them together. Once cured, the concrete slab 36 is taken out of the mould for constructing the first composite panel 20. The slab adhesive film 34 and the aluminium web 32 are sequentially attached to one side of the concrete slab 36. When curing the slab adhesive film 34, the plate adhesive film 30 is pasted onto the concrete baseplate 28. Both the plate adhesive film 30 and the concrete baseplate 28 are brought onto ridges 55 of the aluminium web 32 after curing the slab adhesive film 34. The plate adhesive film 30 is thereafter cured as well such that the concrete slab 36, the aluminium web 32 and the concrete baseplate 28 are permanently glued together as one monolithic panel 58.

The monolithic panel 58 lies on the concrete baseplate when assembling remaining parts of the first composite panel 20. Particularly, the cells 31 of the fibreglass web 40 are packed with polyurethane foam 50 such that the fibreglass web 40 is free from voids. Similar to the process before, the slab adhesive layer 38 is provided onto exposed surface of the concrete slab 36, and the fibreglass web 40 is brought onto the slab adhesive layer 38 later for curing. Finally, the plate adhesive layer 42 and the concrete faceplate 44 are consecutively attached to the fibreglass web 40 for curing or settling. Upon completion, edges of first composite panel 20 are polished or smoothened for complying with predetermined dimension and surface finishing requirements.

Figure 3:
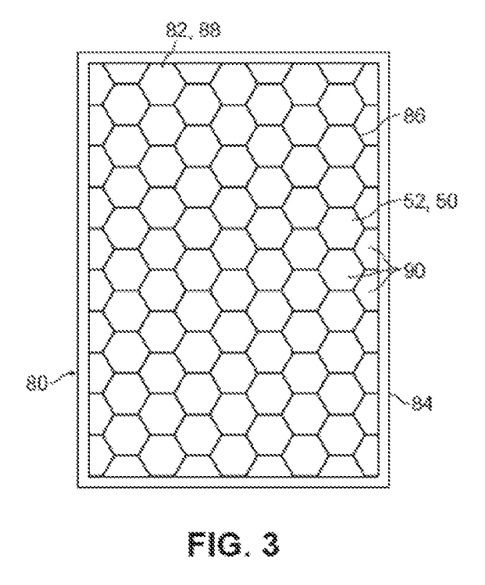
FIG. 3 illustrates a second composite panel.

FIG. 3 relates to a second embodiment of the present application. Particularly, FIG. 3 depicts parts or method steps that are similar or identical to those of one or more other embodiments. Description of the identical or similar parts or method steps is therefore incorporated by reference wherever appropriate.

In detail, FIG. 3 illustrates a second composite panel 80, which is also known as composite sandwich panel. The second composite panel 80 is exposed on one broad planar surface 82, showing a concrete frame 84, a paper honeycomb core 86 and polyurethane foam 50 as its filler 52. The broad planar surface 82 and its opposite side (not visible) 88 are graphite skin or face sheet. The graphite skin covers edges of the concrete frame 84, whilst the graphite skin may be replaced by fibre, aluminium or epoxy skin. The concrete frame 84 is homopolymer polypropylene fibre reinforced concrete that is created by a mould surrounding the paper honeycomb web. The concrete frame 84 also has an embedded roughed rectangular steel bar (not shown) of a rectangular profile, which supports and protects paper honeycomb web from external impact or heat (e.g. fire flame).

The paper honeycomb web is formed by the paper honeycomb core 86 and the polyurethane foam 50. Particularly, peripheral edges of the paper honeycomb core 86 are wrapped around by the polyurethane foam 50 such that neighbouring cells 90 of the paper honeycomb core 86 are linked by the filler 52. In other words, the paper honeycomb core 86 is wrapped around by its filler 52. The polyurethane foam 50 is porous such that it can attenuate sound (e.g. noise).

Here, the paper honeycomb core 86 may be replaced by metal (including alloy), plastics, ceramics or combinations of any of these. The filler 52 may adopt hard foams of phenol resin, polystyrene or other plastic materials. The concrete frame 84 may be swapped with a metal (e.g. stainless steel or aluminium alloy) frame that is integral with the paper honeycomb web.

In use, the second composite panel 80 provides a curtain wall (non-load bearing) or load-bearing wall of light-duty to a building 26 when fixed onto structural support (not shown). The second composite panel 80 has light weight and is able to insulate heat, block sunlight and cut off noise.

Figure 4:
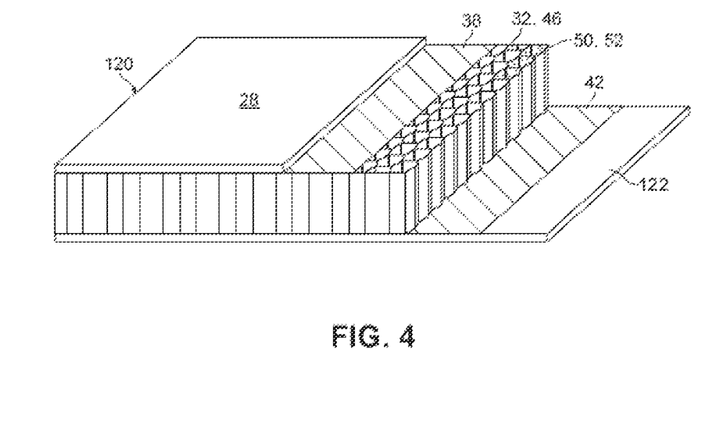
FIG. 4 illustrates a third composite panel.

FIG. 4 relates to a third embodiment of the present application. Particularly, FIG. 4 depicts parts or method steps that are similar or identical to those of one or more other embodiments. Description of the identical or similar parts or method steps is therefore incorporated by reference wherever appropriate.

In detail, FIG. 4 illustrates a third composite panel 120 that comprises a concrete baseplate 28, a slab adhesive layer 38, an aluminium web 32, a plate adhesive layer 42 and a transparent face sheet 122, from top to bottom sequentially. The third composite panel 120 has a concrete frame 84 of rectangular shape (not shown), which surrounds peripheral edges of the aluminium web 32. The concrete frame 84 also joins the concrete baseplate 28 and the transparent face sheet 122 at its opposite sides in forming the monolithic third composite panel 120. Particularly, the transparent face sheet 122 is made of Perspex™ material (acrylic glass, Lucite, acrylite), which is also known as poly (methyl methacrylate) (PMMA) as a transparent thermoplastic. The transparent face sheet 122 permits sunlight from entering cells 46 of the aluminium web 32 such that the third composite panel 120 provides improved heat insulation, as compared to the transparent face sheet 122 alone. Since cylindrical surfaces of the aluminium web 32 are polished and smooth, the third composite panel 120 can reflect light for brightening interior of the building 26.

The transparent face sheet 122 may be alternatively substituted by an architectural glass panel having sufficient thickness for structural support. Examples of architectural glass include float glass, prism glass, toughened glass (tempered glass), self-cleaning glass, etc. In practice, a tempered glass panel of 20 mm (millimetre) thickness as the transparent face sheet 122 can support weight of the entire third composite panel 120 and its surrounding structure. The third composite panel 120 may partially submerged into the concrete foundation 22, joining with neighbouring building components (e.g. bricks) or both.

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

What is claimed is:

1. A composite panel for green building system, the composite panel comprising:
   a first layer of honeycomb structure,
   a load-bearing layer attached to the first layer of honeycomb structure for carrying external load in a lateral direction of the honeycomb structure; and
   a second layer of honeycomb structure that is attached to the load-bearing layer on an opposite side of the first layer of honeycomb structure;
   wherein the load-bearing layer is provided by fibre-reinforced concrete.

2. The composite panel according to claim 1, wherein the load-bearing layer comprises a frame that surrounds edges of the first layer of honeycomb structure for carrying external load.

3. The composite panel according to claim 1, wherein the load-bearing layer further comprises a slab that extends over ridges of cells of the first layer of honeycomb structure for covering longitudinal ends of the cells.

4. The composite panel according to claim 3, wherein the slab comprises concrete, plastics, glass, metal or combinations of any of these.

5. The composite panel according to claim 1, wherein the load-bearing layer is resistant to water, flame, corrosion, impact, thermal shocks, electromagnetic radiation or combinations of any of these.

6. The composite panel according to claim 4, wherein the load-bearing layer is structurally or internally reinforced.

7. The composite panel according to claim 1, wherein the first layer of honeycomb structure and the second layer of honeycomb structure are made of different materials.

8. The composite panel according to claim 1, wherein cells of the first layer of honeycomb structure and the second layer of honeycomb structure are, void or packed with same filler or different fillers.

9. The composite panel according to claim 8, wherein the filler is wrapped around at least one ridges of the first layer of honeycomb structure, the second layer of honeycomb structure or both.

10. The composite panel according to claim 1, wherein at least parts of the first layer of honeycomb structure are embedded into its face sheet.

11. The composite panel according to claim 1, wherein at least one of its components are transparent.

12. The composite panel according to claim 1, wherein at least one of its components are reflective.

13. A building for residence, the building comprising:
    a foundation for providing structural support to the building, and
    the composite panel according to claim 1.

14. The building according to claim 13, wherein the composite panel is integrated into the foundation.

* * * * *